United States Patent
Mukherjee (10) Patent No.: US 10,542,439 B2
(45) Date of Patent: *Jan. 21, 2020

(54) MULTI-SUBFRAME GRANT WITH SCHEDULING OF BOTH DATA AND CONTROL CHANNELS

(71) Applicant: TELEFONAKTIEBOLAGET LM ERICSSON (PUBL), Stockholm (SE)

(72) Inventor: Amitav Mukherjee, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,210

(22) Filed: Jul. 27, 2018

(65) Prior Publication Data
US 2019/0090230 A1 Mar. 21, 2019

Related U.S. Application Data

(63) Continuation of application No. 15/481,860, filed on Apr. 7, 2017, now Pat. No. 10,070,425, which is a
(Continued)

(51) Int. Cl.
*H04W 72/04* (2009.01)
*H04W 80/06* (2009.01)
(Continued)

(52) U.S. Cl.
CPC ......... *H04W 16/14* (2013.01); *H04W 72/042* (2013.01); *H04W 72/0413* (2013.01);
(Continued)

(58) Field of Classification Search
CPC ......... H04W 72/0413; H04W 72/1284; H04W 74/0866; H04W 74/004; H04W 72/14; H04W 72/1294; H04W 4/20; H04W 80/06
See application file for complete search history.

(56) References Cited

U.S. PATENT DOCUMENTS 9,614,654 B2 * 4/2017 Gaal .................. H04L 5/0053
9,706,567 B2 7/2017 Yang et al.
(Continued)

FOREIGN PATENT DOCUMENTS

| WO | 2011143252 A1 | 11/2011 |
| WO | 2014123379 A1 | 8/2014 |
| WO | 2014168460 A1 | 10/2014 |

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.1.0, Mar. 2014.
(Continued)

*Primary Examiner* — Bobbak Safaipour
(74) *Attorney, Agent, or Firm* — Patent Portfolio Builders PLLC (57) ABSTRACT

A method implemented in a wireless device includes receiving an uplink grant from a network node indicating to the wireless device at least one data subframe and at least one control subframe. The at least one data subframe is one where the wireless device is scheduled to transmit a channel for carrying a data stream and optional control data, and the at least one control subframe is one where the wireless device is scheduled to transmit a channel for carrying control data only. The method further includes transmitting in at least one of the at least one data subframe and the at least one control subframe indicated by the uplink grant.

27 Claims, 7 Drawing Sheets

Related U.S. Application Data continuation of application No. PCT/SE2017/050175, filed on Feb. 24, 2017.

(60) Provisional application No. 62/300,719, filed on Feb. 26, 2016.

(51) Int. Cl.
| | | |
|---|---|---|
| *H04W 72/12* | (2009.01) | |
| *H04W 4/20* | (2018.01) | |
| *H04W 74/00* | (2009.01) | |
| *H04W 74/08* | (2009.01) | |
| *H04W 72/14* | (2009.01) | |
| *H04W 16/14* | (2009.01) | |

(52) U.S. Cl.
CPC ... *H04W 72/1284* (2013.01); *H04W 72/1294* (2013.01); *H04W 72/14* (2013.01); *H04W 74/004* (2013.01); *H04W 74/0866* (2013.01); *H04W 80/06* (2013.01)

(56) References Cited

U.S. PATENT DOCUMENTS

| | | | | |
|---|---|---|---|---|
| 9,762,372 B2* | 9/2017 | Ekpenyong | ............ | H04L 1/0031 |
| 10,070,425 B2* | 9/2018 | Mukherjee | .......... | H04W 72/042 |
| 2010/0002800 A1* | 1/2010 | Kim | ...................... | H04L 5/0037 |
| | | | | 375/295 |
| 2011/0268101 A1* | 11/2011 | Wang | ..................... | H04L 5/0053 |
| | | | | 370/344 |
| 2013/0336273 A1* | 12/2013 | Takeda | ................... | H04L 1/0027 |
| | | | | 370/329 |
| 2014/0133423 A1* | 5/2014 | Froberg Olsson | .... | H04L 5/0053 |
| | | | | 370/329 |
| 2015/0172951 A1* | 6/2015 | Chen | ..................... | H04W 24/10 |
| | | | | 370/252 |
| 2015/0264662 A1 | 9/2015 | Sahlin et al. | | |
| 2015/0334600 A1* | 11/2015 | Hurd | ..................... | H04W 28/18 |
| | | | | 370/329 |
| 2016/0157229 A1* | 6/2016 | Zhuang | ............... | H04L 27/2656 |
| | | | | 370/329 |
| 2017/0041805 A1* | 2/2017 | Chandrasekhar | ........................... | |
| | | | | H04W 74/0816 |
| 2017/0041912 A1* | 2/2017 | Tanaka | ................... | H04W 16/14 |
| 2017/0099664 A1* | 4/2017 | Lunttila | ............ | H04W 72/0446 |
| 2017/0208621 A1* | 7/2017 | Dutta | .................... | H04L 5/0055 |
| 2017/0338986 A1* | 11/2017 | He | ....................... | H04L 27/2602 |
| 2018/0014219 A1* | 1/2018 | Takeda | ................... | H04W 72/08 |
| 2018/0070355 A1* | 3/2018 | Wang | ..................... | H04L 5/0048 |
| 2018/0110071 A1* | 4/2018 | Mukherjee | ............ | H04W 16/14 |

OTHER PUBLICATIONS

3GPP, "3rd Generation Partnership Project; Technical Specification Group Radio Access Network; Evolved Universal Terrestrial Radio Access (E-UTRA); Multiplexing and channel; coding (Release 12)," 3GPP TS 36.212 V12.6.0, Sep. 2015.
3GPP, "3rd Generation Partnership Project; Technical Specification Group Radio Access Network; Evolved Universal Terrestrial Radio Access (E-UTRA); Physical channels and modulation (Release 12)," 3GPP TS 36.211 V12.3.0, Sep. 2014.
3GPP, "3rd Generation Partnership Project; Technical Specification Group Radio Access Network; Evolved Universal Terrestrial Radio Access (E-UTRA); Physical layer procedures (Release 12)," 3GPP TS 36.213 V12.3.0, Sep. 2014.
Ericsson; "On Scheduling Methods for Enhanced LAA"; 3GPP TSG RAN WG1 Meeting #84; R1-160995; Feb. 15-19, 2016; pp. 1-5; Si Julian's, Malta.
Ericsson; "PUCCH Design for Enhanced LAA"; 3GPP TSG RAN WG1 Meeting #84; R1-160998; Feb. 15-19, 2016; pp. 1-4; St. Julian's, Malta.
Final Office Action, dated Oct. 19, 2017, from corresponding U.S. Appl. No. 15/481,860.
International Search Report in corresponding International Application No. PCT/SE2017/050175 dated Jun. 9, 2017.
Office Action, dated Feb. 7, 2018, from corresponding U.S. Appl. No. 15/481,860.
Office Action, dated Jun. 1, 2017, from corresponding U.S. Appl. No. 15/481,860.
Written Opinion in corresponding International Application No. PCT/SE2017/050175 dated Jun. 9, 2017.
Fujutisu; "UL LBT and PUSCH Design for LAA"; 3GPP TSG RAN WG1 Meeting #84; R1-160489 dated Feb. 15-19, 2016; St. Julian's Malta, 6 pages.
Japanese Office Action in corresponding/related Application No. 2018-527211 dated May 20, 2019.
Office Action in corresponding/related European Application No. 17 709 209.5 dated Jul. 5, 2019. (All references not cited herewith have been previously made of record.)
Qualcomm Incorporated; "PUCCH design details"; 3GPP TSG RAN WG1 #84; R1-160888; Feb. 15-19, 2016; St. Julian's, Malta; 3 pages.
Samsung; "Discussion on UCI transmission for UL LAA"; 3GPP TSG RAN WG1 Meeting #84, R1-160558; Feb. 15-19, 2016; St. Julian's, Malta; 2 pages.

* cited by examiner

MULTI-SUBFRAME GRANT WITH SCHEDULING OF BOTH DATA AND CONTROL CHANNELS

TECHNICAL FIELD

Embodiments of the subject matter disclosed herein generally relate to a cellular communications network, and, more particularly, to methods and devices for enabling wireless communication devices to operate in unlicensed radio spectrums in addition to licensed spectrums.

BACKGROUND

Wireless communication may take place within in a dedicated spectrum. For example, up to now, the spectrum used by Long-Term Evolution (LTE) cellular communications networks is dedicated to LTE. This has the advantage that an LTE system does not need to take into account any spectrum coexistence issues with other uses of the spectrum, and that spectrum efficiency can be maximized. However, the spectrum allocated to LTE is limited which may not be able to meet the ever increasing demand for larger throughput from applications and services.

Accordingly, consideration is being given to enabling wireless communication devices to be operable in unlicensed radio spectrums in addition to licensed spectrums. For example, "Licensed-Assisted Access" (LAA) may allow LTE equipment to also operate in the unlicensed 5 GHz radio spectrum. The unlicensed 5 GHz spectrum may be used as a complement to the licensed spectrum. Accordingly, devices may connect in the licensed spectrum (primary cell or PCell) and use carrier aggregation to benefit from additional transmission capacity in the unlicensed spectrum (secondary cell or SCell). Further, it is conceivable that standalone operation of LTE in an unlicensed spectrum may also be possible.

However, the present inventor has recognized that transmissions in an unlicensed spectrum present challenges. An unlicensed spectrum can, by definition, be simultaneously used by multiple different technologies. Therefore, communication by wireless devices in unlicensed spectrums needs to consider coexistence issues with other systems that may utilize the same spectrum, such as IEEE 802.11 (Wi-Fi). For example, operating LTE in the same manner in unlicensed spectrum as in licensed spectrum can seriously degrade the performance of Wi-Fi as Wi-Fi will not transmit once it detects that the channel is occupied.

Accordingly, it would be desirable to provide systems and methods that avoid the afore-described problems and drawbacks and which, more specifically, provide for methods and devices enabling wireless communication devices to operate in unlicensed radio spectrums in addition to licensed spectrums.

SUMMARY

In various embodiments described in this document, a multi-subframe grant indicates to a wireless device one or more data and control subframes for communication in an unlicensed radio spectrum in addition to or in place of a licensed spectrum.

According to an embodiment there is a method implemented in a wireless device. The method includes receiving an uplink grant from a network node indicating to the wireless device at least one data subframe and at least one control subframe. The at least one data subframe is one where the wireless device is scheduled to transmit a channel for carrying a data stream and optional control data, and the at least one control subframe is one where the wireless device is scheduled to transmit a channel for carrying control data only. The method further includes transmitting in at least one of the at least one data subframe and the at least one control subframe indicated by the uplink grant.

According to another embodiment there is a wireless device. The wireless device includes a receiver, a transmitter, at least one processor, and a memory. The memory stores instructions executable by the at least one processor for receiving, using the receiver, an uplink grant from a network node indicating to the wireless device at least one data subframe and at least one control subframe. The at least one data subframe is one where the wireless device is scheduled to transmit a channel for carrying a data stream and optional control data, and the at least one control subframe is one where the wireless device is scheduled to transmit a channel for carrying control data only. The memory stores instructions executable by the at least one processor for transmitting, using the transmitter, in at least one of the at least one data subframe and the at least one control subframe indicated by the uplink grant.

According to yet another embodiment there is a method implemented in a network node. The method includes transmitting an uplink grant indicating to a wireless device at least one data subframe and at least one control subframe. The at least one data subframe is one where the wireless device is scheduled to transmit a channel for carrying a data stream and optional control data, and the at least one control subframe is one where the wireless device is scheduled to transmit a channel for carrying control data only. The method further includes receiving, from a wireless device having received the uplink grant, transmissions in at least one of the at least one data subframe and the at least one control subframe indicated by the uplink grant.

According to yet another embodiment there is a network node. The network node includes a receiver, a transmitter, at least one processor, and a memory. The memory stores instructions executable by the at least one processor for transmitting, using the transmitter, an uplink grant indicating to a wireless device at least one data subframe and at least one control subframe. The at least one data subframe is one where the wireless device is scheduled to transmit a channel for carrying a data stream and optional control data, and the at least one control subframe is one where the wireless device is scheduled to transmit a channel for carrying control data only. The memory stores instructions executable by the at least one processor for receiving, using the receiver, from a wireless device having received the uplink grant, transmissions from the wireless device in at least one of the at least one data subframe and the at least one control subframe indicated by the uplink grant.

BRIEF DESCRIPTION OF THE DRAWINGS

The accompanying drawings, which are incorporated in and constitute a part of the specification, illustrate one or more embodiments and, together with the description, explain these embodiments. On the drawings.

DETAILED DESCRIPTION

The following description of the embodiments refers to the accompanying drawings. The same reference numbers in different drawings identify the same or similar elements. The following detailed description does not limit the invention. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Features, structures or characteristic described as being separate may be combined into a single feature, structure, or characteristic. Similarly, features, structures or characteristics described as being individual may be split into two or more features, structures or characteristics. For example, although a single memory 1208 is disclosed with reference to FIG. 12, the memory may be split into more than one memory or even more than one type of memory. Likewise, the receiver 1202 and transmitter 1204 disclosed with reference to FIG. 12 may be combined into a transceiver.

The following abbreviations are used in this document:
ACK Acknowledgement
B-IFDMA Block-Interleaved Frequency Division Multiple Access
CA Carrier Aggregation
CC Component Carrier
CCA Clear Channel Assessment
CFI Control Format Indicator
C-PDCCH Common Physical Downlink Control Channel
CRC Cyclic Redundancy Check
C-RNTI Cell Radio Network Temporary Identifier
CRS Cell-Specific Reference Symbols
CSMA/CA carrier sense multiple access with collision avoidance
CW Contention Window
DCF Distributed Coordination Function
DCI Downlink Control Indicator
DFT Discrete-Fourier-Transform
DIFS DCF Inter-Frame Space
DL Downlink
DMRS Demodulation Reference Signals
DwPTS Downlink Pilot Time Slot
eNB eNodeB
eLAA enhanced Licensed-Assisted Access
EPDCCH Enhanced Physical Downlink Control Channel
ePUCCH extended Physical Uplink Control Channel
FDMA Frequency-Division Multiple Access
HARQ Hybrid Automatic-Repeat-Request
LAA Licensed-Assisted Access
LBT Listen-Before-Talk
LTE Long Term Evolution
LTE-A LTE-Advanced
MCOT Maximum Channel Occupancy Time
MCS Modulation and Coding Scheme
MSF Multi-Subframe Grant
NACK Negative Acknowledgement
PCell Primary Cell
PDCCH Physical Downlink Control Channel
PUCCH Physical Uplink Control Channel
PUSCH Physical Uplink Shared Channel
OFDM Orthogonal Frequency Division Multiplexing
SC-FDMA Single Carrier Frequency-Division Multiple Access
SCell Secondary Cell
sPUCCH short Physical Uplink Control Channel
SRS Sounding Reference Signals
TXOP Transmission Opportunity
UE User Equipment
UCI Uplink Control Information
UL Uplink
WLAN Wireless Local Area Network As mentioned above, the present inventor has recognized that transmissions in an unlicensed spectrum present challenges.

Regulatory requirements may not permit transmissions in an unlicensed spectrum without prior channel sensing. Since the unlicensed spectrum is shared with other radios of similar or dissimilar wireless technologies, a so called listen-before-talk (LBT) method may need to be applied. LBT involves sensing the medium for a predefined minimum amount of time and backing off if the channel is busy. By way of non-limiting example, the unlicensed 5 GHz spectrum is mainly used by equipment implementing the Institute of Electrical and Electronics Engineers (IEEE) 802.11 Wireless Local Area Network (WLAN) standard. This standard is known under its marketing brand "Wi-Fi."

It should be noted that the present embodiments are discussed in conjunction with the Long Term Evolution (LTE) wireless communication standard and Wi-Fi wireless standard. Those skilled in the art will appreciate that the present invention is not limited to application to LTE and Wi-Fi wireless communications systems but can instead be applied to any such systems.

To provide context for the exemplary embodiments, a discussion of the relevant aspects of LTE and Wi-Fi may be beneficial.

LTE

Figure 1:
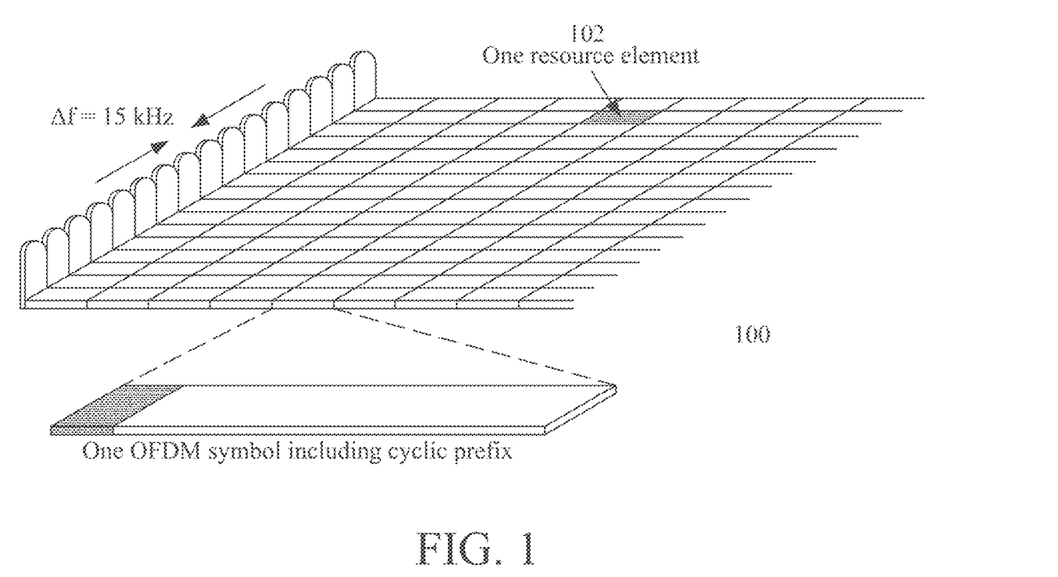
FIG. 1 is a schematic representation of an exemplary LTE downlink time-frequency grid.

FIG. 1 is a schematic representation of an exemplary LTE downlink time-frequency grid 100. LTE uses Orthogonal Frequency Division Multiplexing (OFDM) in the downlink and Discrete-Fourier-Transform DFT-spread OFDM (also referred to as single-carrier Frequency-Division Multiple Access FDMA) in the uplink. The basic LTE downlink physical resource can thus be seen as a time-frequency grid 100 as illustrated in FIG. 1, where each resource element 102 corresponds to one OFDM subcarrier during one OFDM symbol interval. The uplink subframe has the same subcarrier spacing as the downlink and the same number of SC-FDMA symbols in the time domain as OFDM symbols in the downlink.

Figure 2:
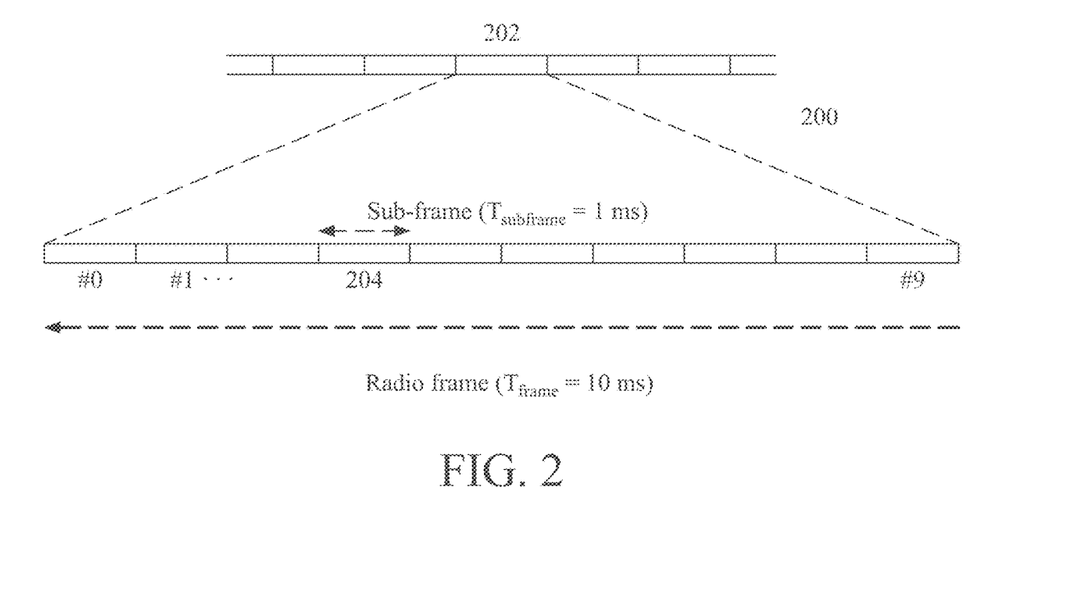
FIG. 2 is a schematic representation of an exemplary LTE time-domain structure.

FIG. 2 is a schematic representation of an exemplary LTE time-domain structure 200. In the time domain, LTE downlink transmissions are organized into radio frames 202 of 10 ms, each radio frame 202 consisting of ten equally-sized subframes 204 of length Tsubframe=1 ms as shown in FIG. 2. Each subframe comprises two slots of duration 0.5 ms each, and the slot numbering within a frame ranges from 0 to 19. For normal cyclic prefix, one subframe 204 consists of 14 OFDM symbols. The duration of each symbol is approximately 71.4 μs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Figure 3:
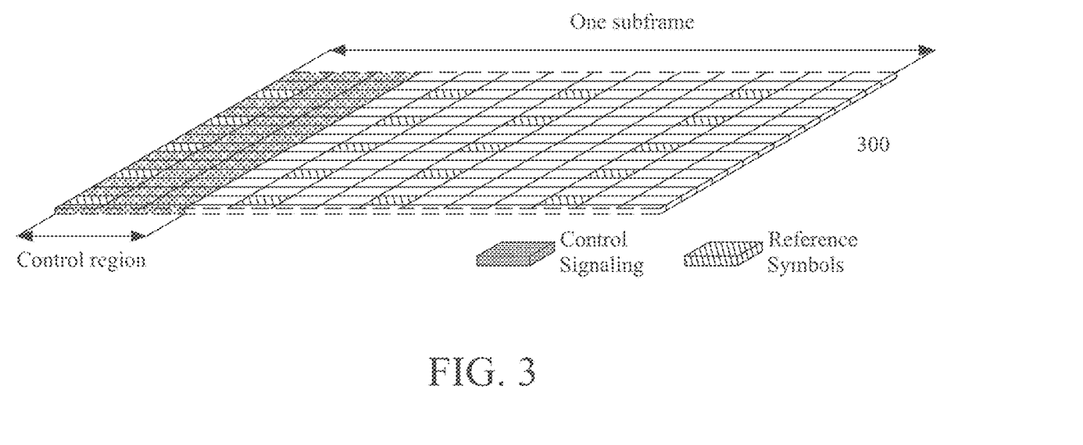
FIG. 3 is a schematic representation of an exemplary downlink subframe.

FIG. 3 is a schematic representation of an exemplary downlink subframe 300. Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe 300 also contains common reference symbols, which are known to the receiver and used for coherent demodulation of e.g. the control information. A downlink system with CFI=3 OFDM symbols as control is illustrated in FIG. 3. The reference symbols shown there are the cell specific reference symbols (CRS) and are used to support multiple functions including fine time and frequency synchronization and channel estimation for certain transmission modes.

Figure 4:
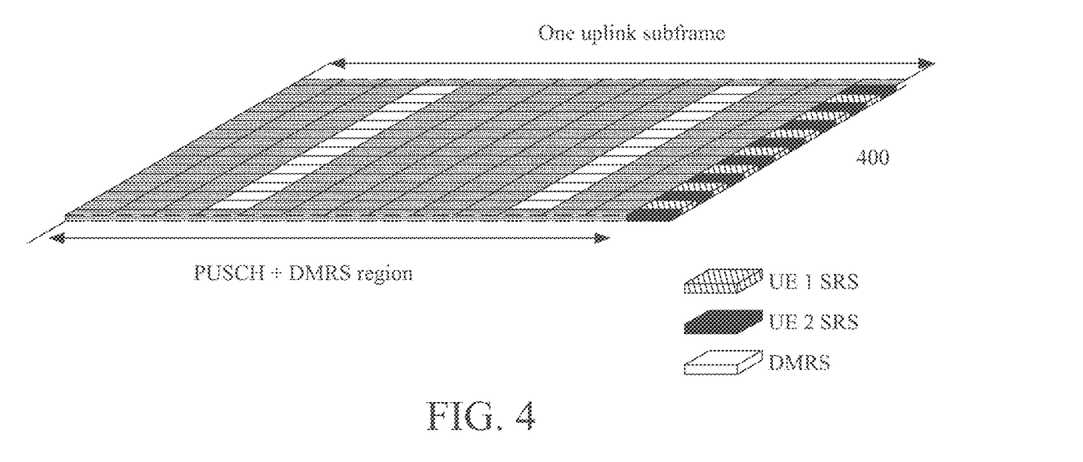
FIG. 4 is a schematic representation of an exemplary uplink subframe.

FIG. 4 is a schematic representation of an exemplary uplink subframe 400. Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in the Physical Uplink Shared Channel (PUSCH), uplink control information in the Physical Uplink Control Channel (PUCCH), and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. Note that UL DMRS and SRS are time-multiplexed into the UL subframe 400, and SRS are always transmitted in the last symbol of a normal UL subframe 400. The PUSCH DMRS is transmitted once every slot for subframes with normal cyclic prefix, and is located in the fourth and eleventh SC-FDMA symbols.

In later implementations of LTE, DL or UL resource assignments can also be scheduled on the enhanced Physical Downlink Control Channel (EPDCCH). For earlier releases, only the Physical Downlink Control Channel (PDCCH) is available. Resource grants are UE specific and are indicated by scrambling the DCI Cyclic Redundancy Check (CRC) with the UE-specific C-RNTI identifier.

In LTE and LTE-Advanced (LTE-A), each UL transmission on the PUSCH can be dynamically scheduled using a single UL grant sent in a DL subframe with DCI format 0 on the PDCCH or EPDCCH. The UL transmission takes place 4 ms after the UL grant is received. Therefore, to dynamically schedule N UL PUSCH transmissions over N subframes by a UE, N UL grants need to be sent in N DL subframes by the serving cell. Alternatively, periodic UL PUSCH transmissions can be scheduled using semi-persistent scheduling without the need for an UL grant for every UL transmission.

Figure 5:
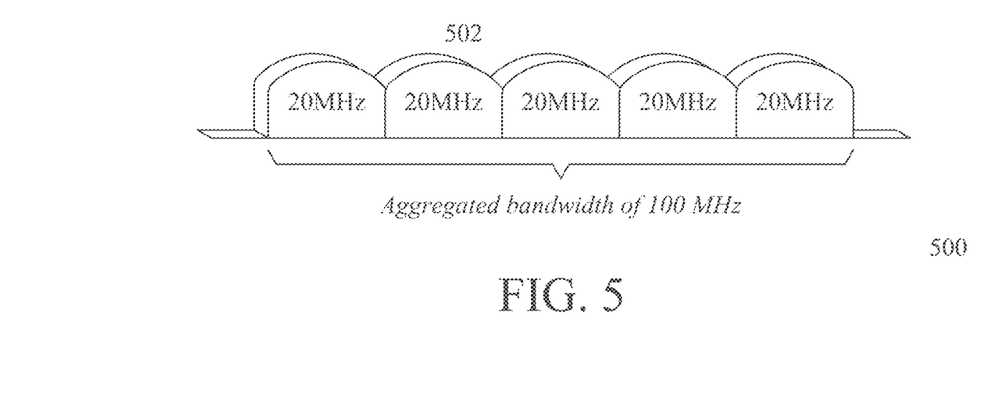
FIG. 5 is a schematic representation of carrier aggregation.

FIG. 5 is a schematic representation of carrier aggregation 500. A later release of LTE supports bandwidths larger than 20 MHz. It may be desirable to assure backwards compatibility with earlier releases that may not support bandwidths larger than 20 MHz. This should also include spectrum compatibility. Accordingly, a carrier wider than 20 MHz, should appear as a number of LTE carriers to earlier LTE terminals. Each such carrier can be referred to as a Component Carrier (CC). In particular for early deployments of LTE supporting bandwidths larger than 20 MHz, it can be expected that there will be a smaller number of larger than 20 MHz capable terminals compared to LTE legacy terminals not supporting bandwidths larger than 20 MHz. Therefore, it is necessary to assure an efficient use of a wide carrier also for legacy terminals, i.e. that it is possible to implement carriers where legacy terminals can be scheduled in all parts of the wideband (greater than 20 MHz) carrier. The straightforward way to obtain this would be by means of Carrier Aggregation (CA). CA implies that an terminal supporting bandwidths larger than 20 MHz can receive multiple CC, where the CC have, or at least the possibility to have, the same structure earlier LTE release carriers. CA 500 is illustrated in FIG. 5. A CA-capable UE is assigned a primary cell (PCell) which is always activated, and one or more secondary cells (SCells) which may be activated or deactivated dynamically.

The number of aggregated CC 502 as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal: A terminal may for example support more downlink CCs than uplink CCs, even though the cell is configured with the same number of uplink and downlink CCs.

WI-FI

A discussion of the relevant aspects of Wi-Fi is provided in the interest of context. In typical deployments of Wireless Local Area Networks (WLANs), carrier sense multiple access with collision avoidance (CSMA/CA) is used for medium access. This means that the channel is sensed to perform a clear channel assessment (CCA), and a transmission is initiated only if the channel is declared as Idle. In case the channel is declared as busy, the transmission is essentially deferred until the channel is deemed to be Idle.

Figure 6:
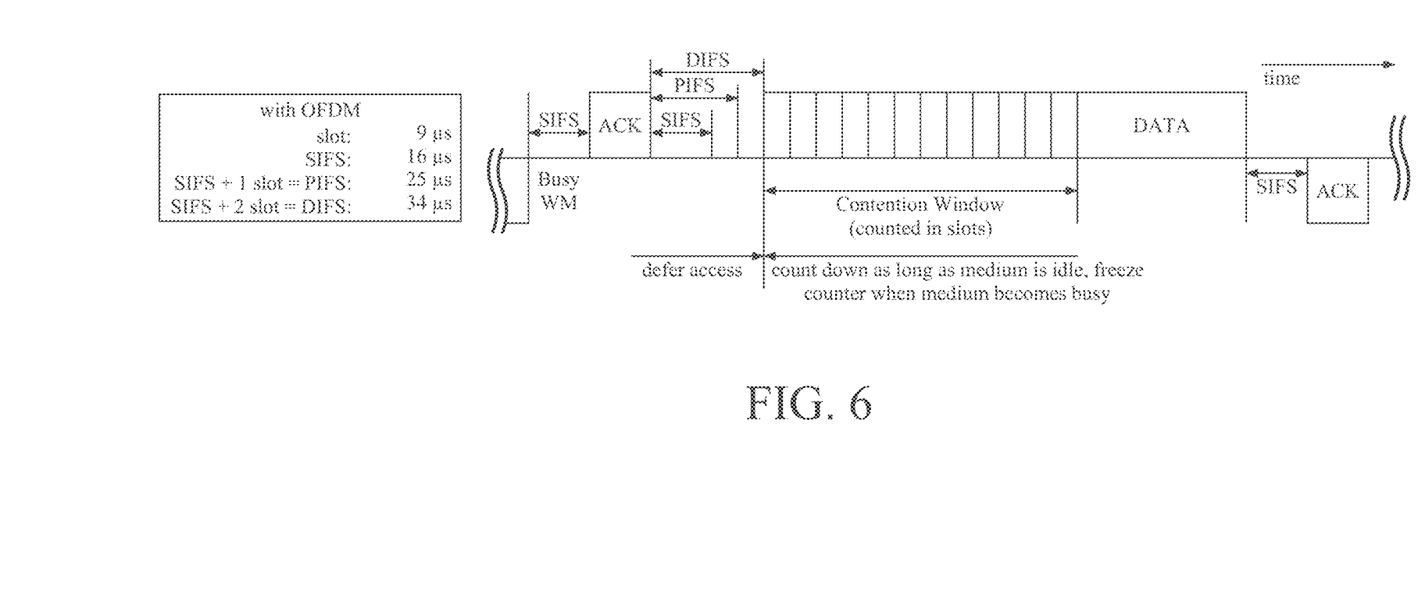
FIG. 6 is a schematic representation of a Listen Before Talk (LBT) mechanism of Wi-Fi.

FIG. 6 is a schematic representation of a Listen Before Talk (LBT) mechanism 600 of Wi-Fi. After a Wi-Fi station A transmits a data frame to a station B, station B shall transmit the ACK frame back to station A with a delay of 16 μs. Such an ACK frame is transmitted by station B without performing a LBT operation. To prevent another station interfering with such an ACK frame transmission, a station shall defer for a duration of 34 μs (referred to as DIFS) after the channel is observed to be occupied before assessing again whether the channel is occupied. Therefore, a station that wishes to transmit first performs a Clear Channel Assessment (CCA) by sensing the medium for a fixed duration DIFS. If the medium is idle then the station assumes that it may take ownership of the medium and begin a frame exchange sequence. If the medium is busy, the station waits for the medium to go idle, defers for DIFS, and waits for a further random backoff period.

When the medium becomes available, multiple Wi-Fi stations may be ready to transmit, which can result in collision. To reduce collisions, stations intending to transmit select a random backoff counter and defer for that number of slot channel idle times. The random backoff counter is selected as a random integer drawn from a uniform distribution over the interval of [0, CW]. The default size of the random backoff contention window, CWmin, may be set in the IEEE specifications. It should be appreciated that collisions can still happen even under this random backoff protocol when there are many stations contending for channel access. Hence, to avoid recurring collisions, the backoff contention window size CW is doubled whenever the station detects a collision of its transmission up to a limit, CWmax, which also may be set in the IEEE specifications. When a station succeeds in a transmission without collision, it resets its random backoff contention window size back to the default value CWmin.

Unlicensed Spectrum

Up to now, the spectrum used by LTE is dedicated to LTE. This has the advantage that LTE system does not need to take into account the coexistence issue, and that spectrum efficiency can be maximized. However, the spectrum allocated to LTE is limited which cannot meet the ever increasing demand for larger throughput from applications/services. Licensed-Assisted Access (LAA) extended LTE to exploit an unlicensed spectrum in addition to the licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in the unlicensed spectrum as in the licensed spectrum can seriously degrade the performance of Wi-Fi as Wi-Fi will not transmit once it detects that the channel is occupied.

Figure 7:
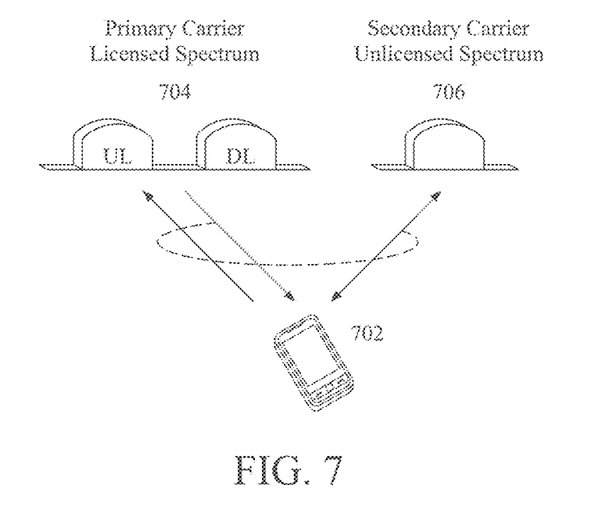
FIG. 7 is a schematic representation of Licensed-Assisted Access (LAA) to unlicensed spectrum using LTE carrier aggregation.

One way to utilize the unlicensed spectrum reliably is to transmit essential control signals and channels on a licensed carrier. FIG. 7 is a schematic representation of Licensed-Assisted Access (LAA) to unlicensed spectrum using LTE carrier aggregation. That is, as shown in FIG. 7, a UE 702 is connected to a PCell 704 in the licensed band and one or more SCells 706 in the unlicensed band. A secondary cell in unlicensed spectrum may be referred to herein as licensed-assisted access secondary cell (LAA SCell). In the case of standalone operation as in MuLTEfire, no licensed cell is available for uplink control signal transmissions.

The maximum channel occupancy time (MCOT) of a single DL+UL Transmission Opportunity (TXOP) in unlicensed bands is limited by regional regulatory restrictions. For example, in Europe, EN BRAN is considering the following MCOT rules: Specify max TxOP=6 ms available for 100% of the time; Specify max TxOP=8 ms is available for 100% of time with a minimum pause of [TBD] μs (in order of 100's μs) after a maximum transmission of 6 ms; Specify max TxOP=10 ms is available for [TBD3] % of the time.

In one implementation of eLAA, flexible timing between UL grant and UL transmission may be supported, with a minimum delay between UL grant and UL transmission being 4 ms. Furthermore, UL PUSCH scheduling may down-select from one of the following options:

Option 1: Single UL grant in a subframe for a UE can schedule N (N≥1) PUSCH transmissions for the UE in N subframes with single PUSCH per subframe. N may be consecutive or non-consecutive.

Option 2: Single UL grant in a subframe for a UE can schedule single PUSCH transmission in a single subframe while UE can receive multiple UL grants in a subframe for PUSCH transmissions in different subframes.

Option 3: Single UL grant in a subframe for a UE can enable the UE to transmit single PUSCH transmission among one of the multiple subframes depending on UL LBT result.

Two stage grants: A common semi-persistent grant provides high level information (e.g. Resource Block (RB) allocation, Modulation and Coding Scheme (MCS) etc.) and a second grant in a subframe for a UE can schedule PUSCH transmissions following options 1 and 2 for certain UL subframes.

Option 1 above is what may be defined to be a multi-subframe grant. Multi-subframe grants offer significant benefits in terms of reducing control signaling overhead and the need for one DL transmission carrying the grant for every scheduled UL transmission, which severely degrades UL throughput in unlicensed bands.

In the MuLTEfire Alliance Forum, it has been agreed that multi-subframe grants are supported for UL transmissions.

Regarding UL LBT for the PUSCH after a grant is received, in one implementation of eLAA, the UL LBT for self-scheduling can use either a single CCA duration of at least 25 μs (similar to DL DRS), or a random backoff scheme with a defer period of 25 μs including a defer duration of 16 us followed by one CCA slot, and a maximum contention window size that is to be determined. These options are also applicable for cross-carrier scheduling of UL by another unlicensed SCell. Similar LBT options are valid for ePUCCH transmission.

Figure 8:
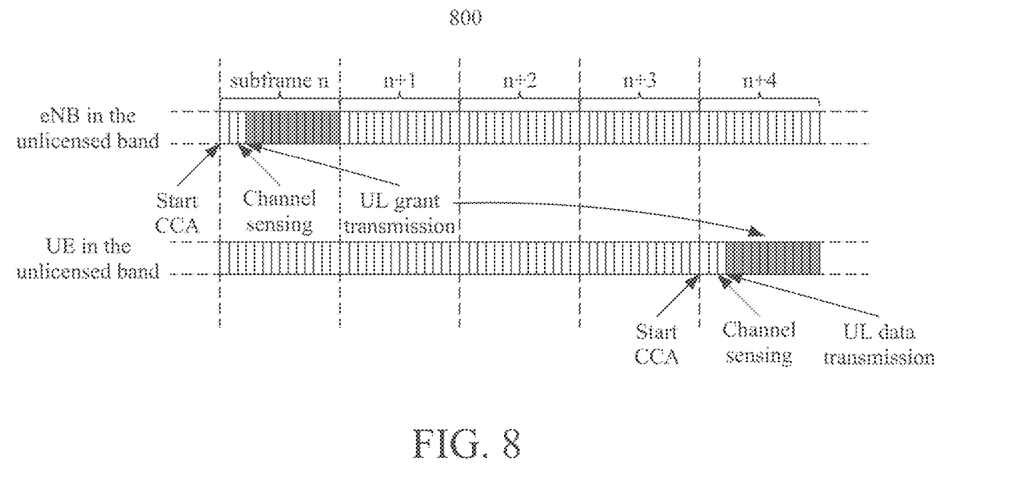
FIG. 8 is a schematic representation of UL LAA listen before talk transmission.

FIG. 8 is a schematic representation of UL LAA listen before talk transmission 800. In FIG. 8, the UL grant is sent on an unlicensed carrier.

Figure 9:
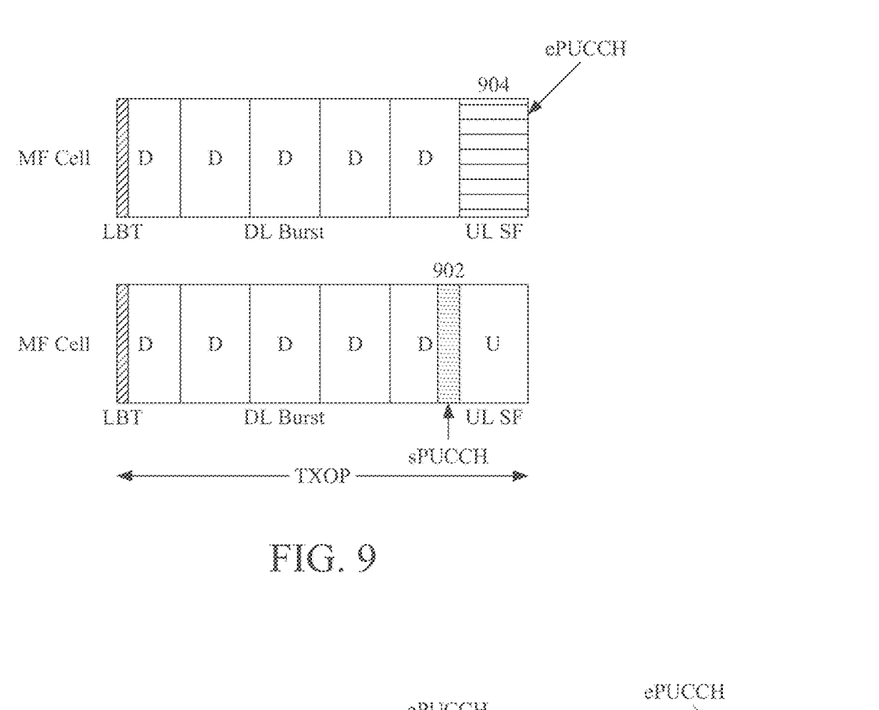
FIG. 9 is a schematic representation of two forms of PUCCH transmission.

Two forms of PUCCH transmission have been defined for MuLTEfire: a short PUCCH (sPUCCH) 902 comprising between two to six symbols in time, and a longer, enhanced PUCCH (ePUCCH) 904 which spans one subframe in time, as shown in FIG. 9. The sPUCCH 902 occurs immediately after the DwPTS portion of a partial DL subframe as defined in Rel-13 LAA, while the ePUCCH 904 can be multiplexed with PUSCH transmissions in 1-ms UL subframes. Both sPUCCH and ePUCCH utilize an interlaced transmission mode based on B-IFDMA.

For the triggering of ePUCCH transmissions, both common PDCCH (C-PDCCH) or UL grant (DCI based) based triggers are supported, eNB can use either or both mechanisms.

Figure 10:
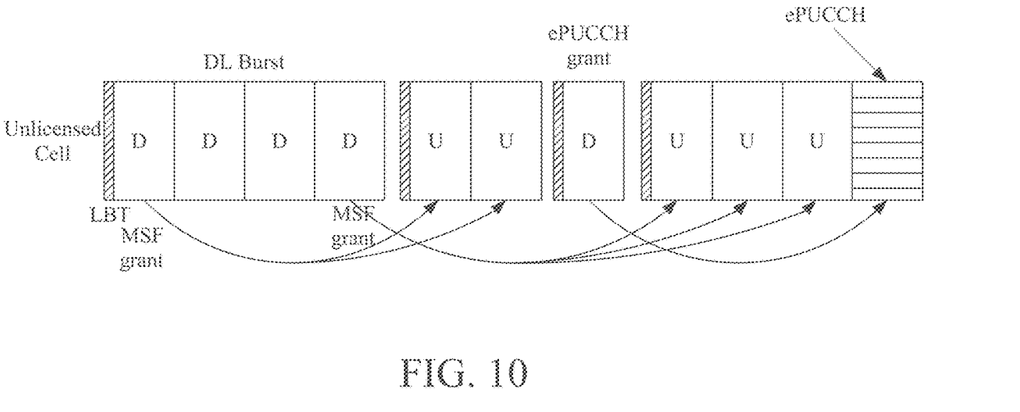
FIG. 10 is a schematic representation of two multi-subframe grants and one ePUCCH grant being sent on a DL to schedule a burst of UL PUSCH transmissions followed by an ePUCCH transmission.

FIG. 10 is a schematic representation of two multi-subframe grants and one ePUCCH grant being sent on a DL to schedule a burst of UL PUSCH transmissions followed by an ePUCCH transmission. If multi-subframe grants are restricted only to UL PUSCH transmissions, then if the eNB wants to trigger ePUCCH transmissions after a burst of UL subframes, then it will have to potentially interrupt a scheduled UL burst of PUSCH subframes with a DL transmission that carries a UL grant for the ePUCCH. This will force the introduction of additional gaps for DL and UL LBT, reduce UL throughput, increase overhead, and increase the risk of losing the medium to Wi-Fi or other LAA nodes. An example of such an inefficient mode of operation is shown in FIG. 10, where four LBT steps and three UL grants in total are needed to schedule a burst of UL PUSCH transmissions followed by an ePUCCH transmission.

In MuLTEfire, the ePUCCH transmission may also be triggered using the C-PDCCH. Currently, four reserved bits are available in the C-PDCCH to indicate the status of upcoming UL subframes (for example, whether they are full or partial UL subframes). Since the C-PDCCH is cell-specific, it does not provide sufficiently granular control to be used as UE-specific multi-subframe grants. Furthermore, using the C-PDCCH to trigger ePUCCH implies that all UEs are forced to send ePUCCH in the same subframe, and multiplexing of ePUCCH and PUSCH from different UEs in the same subframe is not feasible.

Accordingly, embodiments of the present invention use a single, UE-specific multi-subframe UL grant to schedule a sequence of PUSCH and PUCCH transmissions. This approach is applicable to systems such as MuLTEfire, Rel-14 eLAA, LTE in Rel-14 and beyond with multi-subframe grant support, other versions of LTE in unlicensed bands, and NR/5G systems in unlicensed spectrum.

Multi-Subframe UL Grant Indicating Data and Control Subframes

Embodiments of the present invention involve the signaling contained within a UE-specific multi-subframe UL grant that indicates to the UE whether and when to transmit a sequence of one or more PUSCH subframes (i.e., data subframes that may carry a data stream and optionally control data such as UCI) and one or more PUCCH (e.g., ePUCCH) subframes (i.e., control subframes that may carry control data only), where the ordering of PUSCH and PUCCH transmissions within the overall sequence may be arbitrary. It is to be understood that a multi-subframe UL grant may also convey additional information, such as the following examples: resource/interlace assignment and frequency hopping flag; carrier indicator for cross-carrier scheduling; Modulation and Coding Scheme (MCS); New Data Indicator (NDI), HARQ information and Redundancy Version (RV); Power control command for scheduled PUSCH; Cyclic shift for uplink Demodulation RS; Flag bits or bit sequences to configure puncturing of UL subframes for LBT; and Request for transmission of an aperiodic CQI report or aperiodic SRS transmission.

Figure 11:
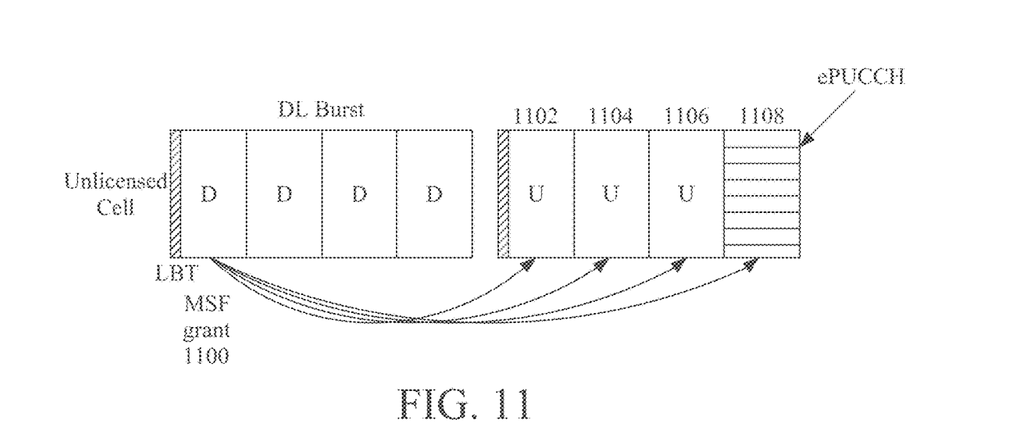
FIG. 11 is a schematic representation of a multi-subframe (MSF) grant according to an exemplary embodiment of the present invention.

FIG. 11 is a schematic representation of a multi-subframe (MSF) grant 1100 according to an exemplary embodiment of the present invention. The MSF grant 1100 may contain a bit sequence to indicate the transmission sequence of one or more PUSCH and ePUCCH transmissions by the same UE over a span of N UL subframes. As a non-limiting example, if the N UL subframes are contiguous in time and the same UE should transmit PUSCH in N−1 subframes and ePUCCH in 1 subframe, then a bit sequence of 2N bits may be sent in the MSF grant 1100, with 2 bits scheduling information for each subframe. For each bit pair per subframe, either the most significant or least significant bit may indicate whether to transmit PUSCH or ePUCCH (e.g., '0' indicates ePUCCH, '1' indicates PUSCH), while the other bit may indicate whether to puncture the UL subframe or not, in order to create a gap for LBT. If the N UL subframes are not contiguous in time, then additional bits may be added to indicate 'no transmission'. An example scheduling outcome with the proposed MSF grant and N=4 contiguous subframes 1102, 1104, 1106, 1108 is shown in FIG. 11. As shown, the first three subframes 1102, 1104, 1106 may be data subframes (e.g., PUSCH) that may carry a data stream and optionally control information, while the fourth subframe 1108 may be a control subframe (e.g., ePUCCH) that may carry control data only. It is not necessary for the ePUCCH to always follow at the end of the UL burst (e.g., in the last subframe 1108 shown in FIG. 11), since a Channel State Information (CSI) report or earlier HARQ ACK/NACK of a preceding DL burst on one or more serving cells may be desired by the serving cell. In such a situation, an uplink grant may include a request for a CSI report or HARQ ACK/NACK information. The CSI report or HARQ ACK/NACK information may be transmitted, for example, in the last subframe of a multi subframe sequence.

In another variation of the above example, the indication of ePUCCH transmission subframe may be done implicitly if the ePUCCH subframe is semi-statically configured to be located after or before the burst of PUSCH transmissions. In that case, the MSF grant may explicitly indicate the locations of the PUSCH subframes using a bitmap or range of start and end subframes, while the UE may infer the ePUCCH location to be in the subframe after the last PUSCH transmission or before the first PUSCH subframe, for example.

In another exemplary embodiment of a MSF grant, the location of the ePUCCH subframe opportunity may be determined based on the cell-specific C-PDCCH and may be common for all UEs, while the UE-specific MSF grant may indicate to a particular UE if it should transmit or suppress its ePUCCH transmission. This may be achieved for example with a (N+1)-length bit sequence, where the first N bits may indicate whether PUSCH transmission subframes should occur or not over N contiguous subframes, while the last bit may indicate whether to transmit or suppress ePUCCH transmission during the common ePUCCH opportunity.

In yet another exemplary embodiment of a MSF grant, multicarrier transmission aspects may be taken into account for the MSF grant. If multiple UL carriers are available, then a single MSF grant may be used to indicate the scheduling sequence of PUSCH and ePUCCH transmissions across multiple UL carriers in parallel. The overall duration of the transmission sequences on the different UL carriers may be different, although they may start from the same subframe. For example, with the same MSF grant, on carrier 1 the UE may be scheduled to transmit N1 PUSCH+ePUCCH subframes, while on carrier 2 the UE may be scheduled to transmit N2 PUSCH+ePUCCH subframes. For each UL carrier, the scheduling indication may be performed using bit sequences as described above for previous embodiments. The knowledge of the sequence lengths may be required per carrier to tell the UE in which subframes to transmit, while the other scheduling information in the grant may tell the UE how to transmit (what MCS, redundancy version, etc.).

Figure 12:
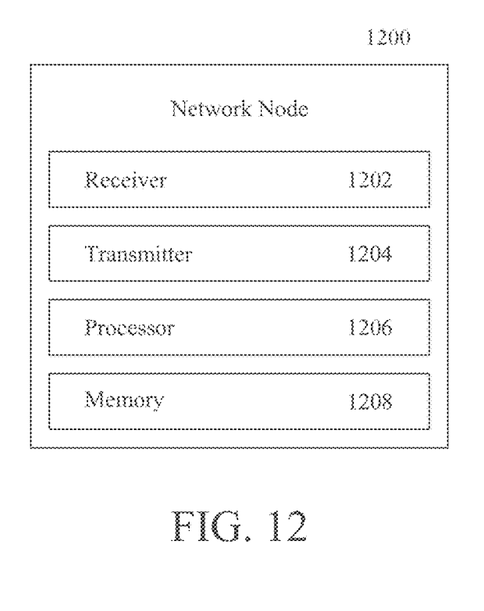
FIG. 12 is a schematic representation of a network node according to an exemplary embodiment of the present invention.
Figure 13:
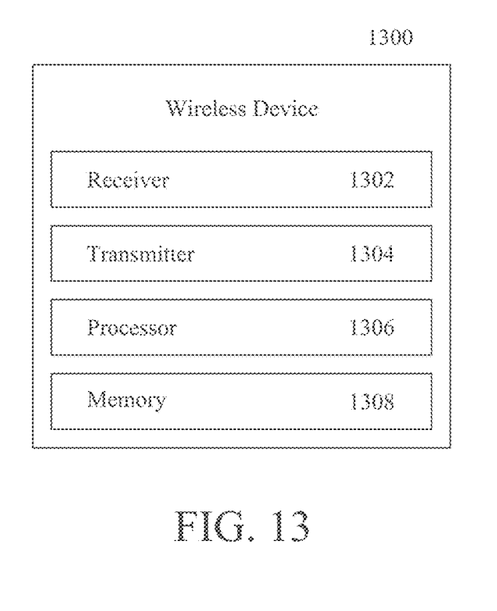
FIG. 13 is a schematic representation of a wireless device according to an exemplary embodiment of the present invention.

FIG. 12 is a schematic representation of a network node 1200 according to an exemplary embodiment of the present invention. The network node 1200 may include a receiver 1202, a transmitter 1204, at least one processor 1206 or processing circuitry, and a memory 1208 that may contain instructions for performing methods according to exemplary embodiments of the present invention. FIG. 13 is a schematic representation of a wireless device 1300 according to an exemplary embodiment of the present invention. The wireless device 1300 may include a receiver 1302, a transmitter 1304, at least one processor 1306 or processing circuitry, and a memory 1308 including instructions for performing methods according to exemplary embodiments of the present invention.

Figure 14:
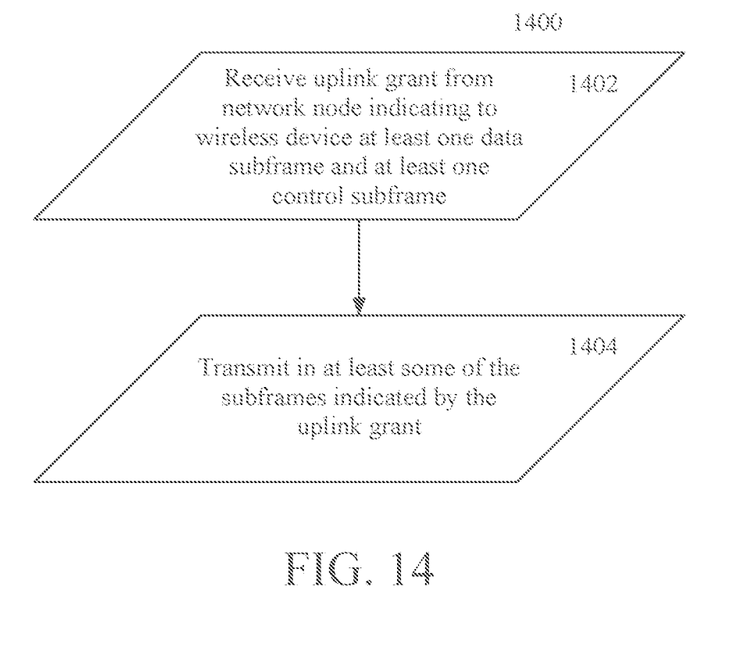
FIG. 14 is a flowchart of an exemplary method implemented by the wireless device of FIG. 13 according to an exemplary embodiment of the present invention.

FIG. 14 is a flowchart of an exemplary method 1400 implemented by the wireless device 1300 of FIG. 13 according to an exemplary embodiment of the present invention. In operation 1402, the wireless device 1300 may receive via receiver 1302 an uplink grant from a network node 1200 indicating to the wireless device 1300 at least one data subframe and at least one control subframe. The uplink grant may a UE-specific multi-subframe UL grant. A data subframe may be one where the wireless device is scheduled to transmit a channel for carrying a data stream and optional control data. For example, a data subframe may be a subframe where the wireless device is scheduled to transmit a PUSCH. A control subframe may be one where the wireless device is scheduled to transmit a channel for carrying control data only. For example, a control subframe may be a subframe where the wireless device is scheduled to transmit either a PUCCH or a ePUCCH. In operation 1404, the wireless device 1300 may transmit via the transmitter 1304 in at least some of the subframes indicated by the uplink grant.

The uplink grant may comprise grant information describing a sequence composed of data subframes and control subframes. The grant information may indicate for each subframe in the sequence whether it is a data subframe or a control subframe. Each subframe in the sequence may be associated with a value in the grant information indicating whether the subframe is a data subframe or a control subframe. Each subframe in the sequence may be associated with a value in the grant information indicating whether to include in the subframe a time gap for accommodating a listen-before-talk procedure. Each subframe in the sequence may be associated with two independently assignable values, the first of which being the value indicating whether the subframe is a data subframe or a control subframe, and the second of which being the value indicating whether to include in the subframe a time gap for accommodating a listen-before-talk procedure.

The method 1400 may further include the operation of receiving on a separate control channel, such as C PUCCH, an indication whether to include in a subframe a time gap for accommodating a listen-before-talk procedure.

As noted above, the sequence of data subframes and control subframes may be implicitly described by the grant information in one embodiment. The implicit description of the sequence may be based on an agreement as to the location of a control subframe relative to the location of a data subframe or a range of data subframes. The implicit description of the sequence may be based on an agreement that a contiguous range of subframes is described in terms of its start and end. For example, the multi subframe grant may explicitly indicate the locations of PUSCH subframes using a bitmap. As another example, the MSF grant may indicate a range of start and end subframes. In such examples, the UE may infer the ePUCCH location to be, for example, in the subframe after the last PUSCH transmission, or alternatively before the first PUSCH subframe. The sequence described by the grant information may begin a predetermined number of subframes after a subframe containing the uplink grant.

In another embodiment noted above, the uplink grant may comprise activation information indicating to the wireless device whether a predefined transmission opportunity is a control subframe. The predefined transmission opportunity may be indicated in advance by signaling received on a control channel common to a plurality of wireless devices. The control channel common to a plurality of wireless devices may be cell-specific. For example, the location of an ePUCCH subframe opportunity may be determined based on cell-specific C-PDCCH and may be common for all UEs. In such an example, a UE-specific MSF grant may indicate to a particular UE if it should transmit or suppress its ePUCCH transmission.

In yet another embodiment described above, the wireless device may be adapted for multicarrier operation and the uplink grant may relate to contemporaneous transmissions on multiple uplink carriers. For example, a single MSF grant may be used to indicate the scheduling sequence of PUSCH and ePUCCH transmissions across multiple UL carriers in parallel. The uplink grant may contain multicarrier information indicating for each uplink carrier a total length of a sequence composed of data subframes and control subframes on that uplink carrier.

The method 1400 may further comprise the operation of initially transmitting a scheduling request to the network node 1200.

Figure 15:
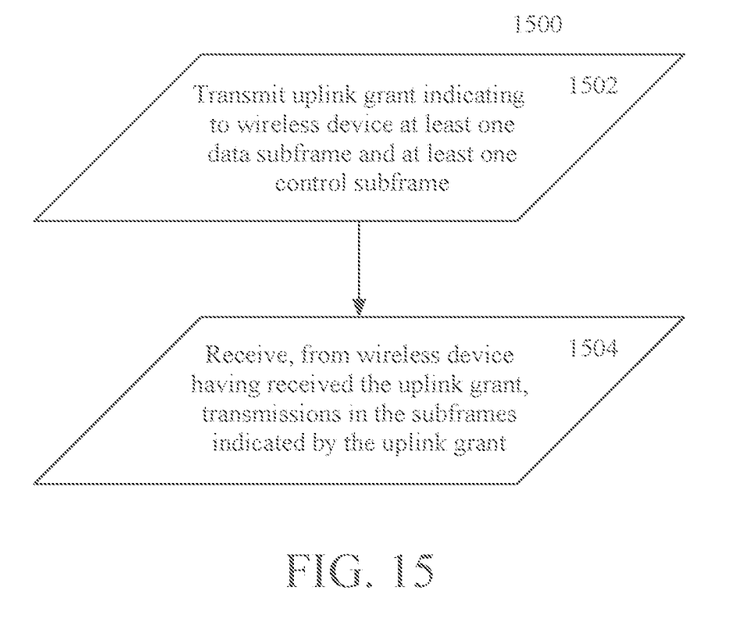
FIG. 15 is a flowchart of an exemplary method implemented by the network node of FIG. 12 according to an exemplary embodiment of the present invention.

FIG. 15 is a flowchart of an exemplary method 1500 implemented by the network node 1200 of FIG. 12 according to an exemplary embodiment of the present invention. In operation 1502, the transmitter 1204 may transmit an uplink grant (e.g., a UE-specific multi-subframe UL grant) indicating to a wireless device 1300 at least one data subframe and at least one control subframe. A data subframe may be one where the wireless device is scheduled to transmit a channel for carrying a data stream and optional control data (e.g., PUSCH), and a control subframe may be one where the wireless device is scheduled to transmit a channel for carrying control data only (e.g., PUSCH or ePUCCH). In operation 1504, the network node 1200 may receive via receiver 1302, from a wireless device 1300 having received the uplink grant, transmissions in the subframes indicated by the uplink grant.

The uplink grant may comprise grant information describing a sequence composed of data subframes and control subframes. The grant information may indicate for each subframe in the sequence whether it is a data subframe or a control subframe. Each subframe in the sequence may be associated with a value in the grant information indicating whether the subframe is a data subframe or a control subframe. Each subframe in the sequence may be associated with a value in the grant information indicating whether to include in the subframe a time gap for accommodating a listen-before-talk procedure. Each subframe in the sequence may be associated with two independently assignable values, the first of which being the value indicating whether the subframe is a data subframe or a control subframe, and the second of which being the value indicating whether to include in the subframe a time gap for accommodating a listen-before-talk procedure.

The method 1500 may further include the operation of transmitting on a separate control channel, such as C PUCCH, an indication whether to include in a subframe a time gap for accommodating a listen-before-talk procedure.

In one embodiment, the sequence of data subframes and control subframes may be implicitly described by the grant information. The implicit description of the sequence may be based on an agreement as to the location of a control subframe relative to the location of a data subframe or a range of data subframes. The implicit description of the sequence may be based on an agreement that a contiguous range of subframes is described in terms of its start and end. The sequence described by the grant information may begin a predetermined number of subframes after a subframe containing the uplink grant.

In another embodiment, the uplink grant may comprise activation information indicating to the wireless device whether a predefined transmission opportunity is a control subframe. The predefined transmission opportunity may be indicated in advance by signaling transmitted on a control channel common to a plurality of wireless devices. The control channel common to a plurality of wireless devices may be cell-specific.

In yet another embodiment, the wireless device may be adapted for multicarrier operation and the uplink grant may relate to contemporaneous transmissions on multiple uplink carriers. The uplink grant may contain multicarrier information indicating for each uplink carrier a total length of a sequence composed of data subframes and control subframes on that uplink carrier.

The method 1500 may further comprise the operation of initially receiving a scheduling request from the wireless device, wherein the uplink grant is transmitted in response to receipt of said scheduling request.

In one or more of the embodiments described herein, the uplink grant may be contained in one subframe. The subframe may have a duration of 1 ms or a duration of the order of 1 ms.

The uplink grant may comprise, in addition to the indication of at least one data subframe and at least one control subframe, one or more of the following: resource/interlace assignment and frequency hopping flag; carrier indicator for cross-carrier scheduling; Modulation and Coding Scheme (MCS); New Data Indicator (NDI); hybrid automatic retransmission request (HARQ) information and Redundancy Version (RV); power control command for scheduled PUSCH; cyclic shift for uplink demodulation reference signal (DMRS); flag bits or bit sequences to configure subframes with a time gap for accommodating a listen-before-talk procedure; request for transmission of an aperiodic channel quality indicator (CQI) report or aperiodic sounding reference signal (SRS) transmission.

The data subframes and control subframes may be transmitted on a listen-before-talk-based carrier, such as unlicensed spectrum. A data subframe may be used to transmit a shared channel, such as PUSCH as specified in 3 GPP LTE. A control subframe may be used to transmit any of PUCCH or ePUCCH as specified in 3 GPP LTE. The uplink grant may be transmitted on PDCCH as specified in 3 GPP LTE.

Embodiments of the present invention can also be expressed in terms of hardware and software modules. For example, a wireless device and/or a network node may include an uplink scheduling module, an uplink grant reception module, and a gap creation module. The modules may be implemented in hardware, software (e.g., software stored in a computer readable medium such as a non-transitory computer readable medium (e.g., memory)) and executed by one or more processors. The modules may operate to provide the functionality of the network nodes and the wireless devices according to one or more of the embodiments described herein.

In view of the above, embodiments are proposed for using a single multi-subframe UL grant to schedule a sequence of both UL data and control channel transmissions.

The embodiments can provide various advantages. For example, by using a single, UE-specific multi-subframe UL grant to schedule a sequence of PUSCH and PUCCH transmissions, there is no need for introducing additional gaps for DL and UL LBT. Additionally, the embodiments provide improved UL throughput, decreased control overhead, and reduced risk of losing channel access to Wi-Fi or other LAA nodes.

Moreover, while it is possible to transmit UCI on PUSCH instead of ePUCCH, the ePUCCH is designed to multiplex multiple UEs on the same interlace, and therefore is more efficient in terms of resource usage for UCI transmission.

It should be understood that this description is not intended to limit the invention. On the contrary, the embodiments are intended to cover alternatives, modifications and equivalents, which are included in the spirit and scope of the claims. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter may include other examples that occur to those skilled in the art. Such other examples are intended to be within the scope of the present application.

The invention claimed is:

1. A method implemented in a wireless device, comprising:
receiving an uplink grant from a network node indicating to the wireless device at least one data subframe and at least one control subframe and comprising a request for a channel state information (CSI) report, wherein the at least one data subframe is one where the wireless device is scheduled to transmit a channel for carrying a data stream and optional control data, and the at least one control subframe is one where the wireless device is scheduled to transmit a channel for carrying control data only; and
transmitting in at least one of the at least one data subframe and the at least one control subframe indicated by the uplink grant,
wherein the uplink grant comprises grant information describing a sequence composed of data subframes and control subframes, each subframe in the sequence being associated with two independently assignable values in the grant information, the first of which being the value indicating whether the subframe is a data subframe or a control subframe, and the second of which being the value indicating whether to include in the subframe a time gap for accommodating a listen-before-talk procedure.

2. The method of claim 1, wherein the grant information indicates for each subframe in the sequence whether it is a data subframe or a control subframe.

3. The method of claim 1, wherein each subframe in the sequence is associated with a value in the grant information indicating whether the subframe is a data subframe or a control subframe.

4. The method of claim 1, further comprising:
receiving on a separate control channel an indication whether to include in the subframe the time gap for accommodating the listen-before-talk procedure.

5. The method of claim 4, wherein the separate control channel comprises a C-physical uplink control channel (C-PUCCH).

6. The method of claim 1, wherein the sequence of data subframes and control subframes is implicitly described by the grant information.

7. The method of claim 6, wherein the implicit description of the sequence is based on an agreement as to the location of a control subframe relative to the location of a data subframe or a range of data subframes.

8. The method of claim 7, wherein the implicit description of the sequence is based on an agreement that a contiguous range of subframes is described in terms of a start and end of the contiguous range.

9. The method of claim 1, wherein the sequence described by the grant information begins a predetermined number of subframes after a subframe containing the uplink grant.

10. The method of claim 1, wherein the uplink grant comprises activation information indicating to the wireless device whether a predefined transmission opportunity is a control subframe.

11. The method of claim 10, wherein the predefined transmission opportunity is indicated in advance by signaling received on a control channel common to a plurality of wireless devices.

12. The method of claim 11, wherein the control channel common to the plurality of wireless devices is cell-specific.

13. The method of claim 1, wherein the wireless device is adapted for multicarrier operation and the uplink grant relates to contemporaneous transmissions on multiple uplink carriers.

14. The method of claim 13, wherein the uplink grant contains multicarrier information indicating for each uplink carrier a total length of a sequence composed of data subframes and control subframes on that uplink carrier.

15. The method of claim 1, further comprising:
initially transmitting a scheduling request to the network node.

16. The method of claim 1, wherein the uplink grant is contained in one subframe.

17. The method of claim 1, wherein the uplink grant comprises, in addition to the indication of at least one data subframe and at least one control subframe and the request for the channel state information (CSI) report, one or more of the following:
resource/interlace assignment and frequency hopping flag;
carrier indicator for cross-carrier scheduling;
Modulation and Coding Scheme (MCS);
New Data Indicator (NDI);
hybrid automatic retransmission request (HARQ) information and Redundancy Version (RV);
power control command for scheduled PUSCH;
cyclic shift for uplink demodulation reference signal (DMRS);
flag bits or bit sequences to configure subframes with the time gap for accommodating the listen-before-talk procedure;
request for transmission of an aperiodic channel quality indicator (CQI) report or aperiodic sounding reference signal (SRS) transmission.

18. The method of claim 1, wherein the uplink grant comprises, in addition to the indication of at least one data subframe and at least one control subframe and the request for the channel state information (CSI) report, a request for hybrid automatic retransmission request (HARQ) information.

19. The method of claim 1, wherein the at least one data subframe and the at least one control subframe are to be transmitted on a listen-before-talk-based carrier, such as unlicensed spectrum.

20. The method of claim 1, wherein the at least one data subframe is used to transmit a shared channel.

21. The method of claim 1, wherein the at least one control subframe is used to transmit any of a physical uplink control channel (PUCCH) or extended PUCCH (ePUCCH) as specified in 3 GPP LTE.

22. The method of claim 1, wherein the uplink grant is transmitted on a physical downlink control channel (PDCCH) as specified in 3 GPP LTE.

23. The method of claim 1, wherein the sequence composed of data subframes and control subframes comprises four total subframes.

24. The method of claim 23, wherein the sequence composed of data subframes and control subframes comprises three data subframes and one control subframe.

25. The method of claim 1, wherein the sequence composed of data subframes and control subframes comprises eight or ten total subframes.

26. A wireless device comprising:
a receiver;
a transmitter;
at least one processor; and
a memory storing instructions executable by the at least one processor for:
receiving, using the receiver, an uplink grant from a network node indicating to the wireless device at least one data subframe and at least one control subframe and comprising a request for a channel state information (CS I) report, wherein the at least one data subframe is one where the wireless device is scheduled to transmit a channel for carrying a data stream and optional control data, and the at least one control subframe is one where the wireless device is scheduled to transmit a channel for carrying control data only; and
transmitting, using the transmitter, in at least one of the at least one data subframe and the at least one control subframe indicated by the uplink grant,
wherein the uplink grant comprises grant information describing a sequence composed of data subframes and control subframes, each subframe in the sequence being associated with two independently assignable values in the grant information, the first of which being the value indicating whether the subframe is a data subframe or a control subframe, and the second of which being the value indicating whether to include in the subframe a time gap for accommodating a listen-before-talk procedure.

27. A network node comprising a receiver, a transmitter, at least one processor and a memory storing instructions executable by the at least one processor for:
  transmitting, using the transmitter, an uplink grant indicating to a wireless device at least one data subframe and at least one control subframe and comprising a request for a channel state information (CSI) report, wherein the at least one data subframe is one where the wireless device is scheduled to transmit a channel for carrying a data stream and optional control data, and the at least one control subframe is one where the wireless device is scheduled to transmit a channel for carrying control data only; and
  receiving, using the receiver, from a wireless device having received the uplink grant, transmissions from the wireless device in the at least one data subframe and the at least one control subframe indicated by the uplink grant,
  wherein the uplink grant comprises grant information describing a sequence composed of data subframes and control subframes, each subframe in the sequence being associated with two independently assignable values in the grant information, the first of which being the value indicating whether the subframe is a data subframe or a control subframe, and the second of which being the value indicating whether to include in the subframe a time gap for accommodating a listen-before-talk procedure.

* * * * *